United States Patent [19]

Howard

[11] Patent Number: 5,176,863
[45] Date of Patent: Jan. 5, 1993

[54] FLEXIBLE GRAPHITE COMPOSITE FIRE RETARDANT WALLPAPER AND METHOD

[75] Inventor: Ronald A. Howard, Brook Park, Ohio

[73] Assignee: Ucar Carbon Technology Corporation, Danbury, Conn.

[21] Appl. No.: 742,641

[22] Filed: Aug. 6, 1991

[51] Int. Cl.⁵ .............................................. B29C 43/00
[52] U.S. Cl. ..................................... 264/113; 264/122
[58] Field of Search ................. 264/113, 115, 122, 109

[56] References Cited

U.S. PATENT DOCUMENTS

| | | | |
|---|---|---|---|
| 3,404,061 | 10/1968 | Shame et al. | 428/143 |
| 3,440,311 | 4/1969 | Olstowski et al. | 264/115 |
| 3,726,738 | 4/1973 | Gellon et al. | 264/113 |
| 4,094,951 | 6/1978 | Ishikawa et al. | 264/325 |
| 4,199,628 | 4/1980 | Caines | 428/36 |
| 4,265,952 | 5/1981 | Caines | 264/122 |
| 4,435,235 | 3/1984 | Atkinson et al. | 156/62.2 |
| 4,722,945 | 2/1988 | Wood et al. | 521/65 |
| 4,961,991 | 10/1990 | Howard | 428/246 |

*Primary Examiner*—Mary Lynn Theisen
*Attorney, Agent, or Firm*—F. J. McCarthy

[57] ABSTRACT

A fire retardant flexible graphite composite is formed from particles of exfoliated flexible graphite and particles of unexfoliated graphite flake treated with an intercalating agent in a desired ratio based upon the strength and desired fire retardant properties of the composite. A wall or floor covering is formed by compressing the composite into a sheet and rolled into a roll.

5 Claims, No Drawings

FLEXIBLE GRAPHITE COMPOSITE FIRE RETARDANT WALLPAPER AND METHOD

FIELD OF THE INVENTION

This invention relates to a fire retardant flexible graphite composite and to a method of forming a fire proof flexible graphite wall or floor covering.

BACKGROUND OF THE INVENTION

When fire occurs on an aircraft or in a confined space in a building, the toxic fumes generated are a major cause of death. Toxic fumes result from the combustion of construction materials such as plastic and synthetic fibers. Recent studies have shown that in an airplane crash the smoke and fumes generated cause far more fatalities than the impact of the crash alone. It would be desirable to limit the propagation of a fire on an airplane or in a building by covering the room separators with a fire retardant material particularly one that could be applied to the surface like wallpaper.

It has been discovered in accordance with the present invention that a composition comprising exfoliated graphite particles and particles of graphite flake treated with an intercalating agent form a composite which is highly fire retardant. This composite of unexfoliated particles of intercalated graphite and exfoliated graphite particles may be formed into a continuous sheet and rolled to produce a wallpaper like roll of fire retardant material or a floor covering.

The fire retardant composite of the present invention comprises particles of exfoliated flexible graphite and unexfoliated particles of intercalated graphite flake with the relative ratio between the particles being based upon the desired strength and fire retardant properties for the composite.

The method of forming a fire proof flexible graphite wall covering in accordance with the present invention comprises:

contacting particles of graphite flake with an intercalating agent for forming particles of intercalated graphite;

heating particles of intercalated graphite at an elevated temperature to form particles of exfoliated graphite;

combining particles of intercalated graphite with particles of exfoliated graphite in a predetermined proportion; and compressing the combined particles into a densely compressed graphite sheet.

DETAILED DESCRIPTION OF THE INVENTION

Graphite is a crystalline form of carbon comprising atoms bonded in flat layered planes with weaker bonds between the planes. By treating particles of graphite, such as natural graphite flake, with an intercalant of, e.g., a solution of sulfuric and nitric acid, the crystal structure of the graphite reacts to form a compound of graphite and the intercalant. The treated particles of graphite are hereafter referred to as "particles of intercalated graphite". Upon exposure to high temperature, the particles of intercalated graphite expand in dimension as much as 80 or more times its original volume in an accordian-like fashion in the c-direction, i.e. in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes.

A common method for manufacturing graphite foil from flexible graphite is described by Shane et al. in U.S. Pat. No. 3,404,061 the disclosure of which is incorporated herein by reference. In the typical practice of the Shane et al. method, natural graphite flakes are intercalated by dispersing the flakes in a solution containing an oxidizing agent of, e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In the preferred embodiment of the invention, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated excess solution is drained from the flakes. The quantity of intercalation solution retained on the flakes after draining is typically greater than 100 parts of solution by weight per 100 parts by weight of graphite flakes (pph) and more typically about 100 to 150 pph. After washing with water, the intercalated graphite flakes are dried and then exfoliated into flexible graphite by exposing them to a flame for only a few seconds at temperature greater than 700° C., more typically 1000° C. or higher.

The quantity of the intercalation solution may be limited to between 10 to 50 parts of solution per hundred parts of graphite by weight (pph) which permits the washing step to be eliminated as taught and described in U.S. Pat. No. 4,895,713 the disclosure of which is also herein incorporated by reference. The exfoliated graphite particles or worms are then compressed and rolled into a densely compressed flexible graphite foil sheet of desired density and thickness. Suitable exfoliation methods and methods for compressing the exfoliated graphite particles into thin foils are disclosed in the aforementioned U.S. Pat. No. 3,404,061 to Shane et al. It should be noted that it is conventional to roll and compress the exfoliated worms in stages with the product of the first or early stages of compression referred to in the art as "flexible mat". The flexible mat is then further compressed into a standard density sheet or foil of preselected thickness. A flexible graphite mat may be compressed into a thin sheet or foil of between 2-70 mils in thickness with a density approaching theoretical density, although a density of about 70 lbs/ft³ is acceptable for most applications.

Flexible graphite is known to be a relatively good thermal barrier with a thermal conductivity along its surface which is approximately twenty (20) or more times greater than through its thickness. It has been discovered in accordance with the present invention that a composite of mixed particles of exfoliated graphite with unexfoliated particles of intercalated graphite flake possesses substantial fire retardant properties. This results from a further decrease in thermal conductivity through the thickness of the composite when exposed to high temperature such as in the presence of a fire. This decrease in thermal conductivity through the thickness of the composite is attributable to its expansion at high temperature. An expansion in thickness of twenty (20) times the unexpanded thickness has been realized from a composite containing about 30 weight percent of unexfoliated particles of intercalated graphite. Unfortunately, the strength of the mixed composite decreases with increasing amounts of unexfoliated particles of intercalated graphite flake. Therefore, a trade off is required for each specific application between optimum strength and thermal conductivity. A two layer composite of mixed particles may be formed by laying down a first bed of exfoliated particles or worms and superimposing a second bed of unexfoliated particles of intercalated graphite in a desired proportion of e.g. 60 g of exfoliated particles to 40 g of intercalated graphite. The percentage of unexfoliated particles of intercalated graphite may range from between 10–60% with 30–50% being preferred and about 40% anticipated as being the optimum. As stated earlier, the ratio between the particles is based upon the desired strength and fire retardant properties for the composite which will vary with each application.

The two beds of graphite particles are rolled into a flexible mat and compressed into a thin two layer sheet. The rolling and calendering operations cause the particles in each bed to intermix at the interface and to form a bonded interface. This, as understood by those skilled in the art, is very significant since it is very difficult to bond graphite once compressed into a foil. A three layer composite may be formed by depositing a first bed of e.g. 20 g of unexfoliated worms, a second bed of e.g. 20 g of exfoliated graphite and a third bed of e.g. 20 g of unexfoliated worms in a symmetrical arrangement. In a three of more layer arrangement the total percentage of unexfoliated particles in the composite should still lie within the desired range of 10–60%.

A fire retardant wall or floor covering is formed from the composite of two or more graphite layers by further compressing the composite into a sheet of desired thickness and rolling the sheet into a continuous roll comparable to a standard roll of wall paper. When exposed to fire the thickness of the wall or floor covering expands forming a highly porous body with a substantial number of air pockets which reduces the thermal conductivity through its thickness. Heat is preferentially conducted sideways through the flexible graphite covering. The covering may be used as a barrier for isolating or separating two areas or rooms from one another. The covering also prevents fire from propagating through the body of the covering thereby acting to contain toxic fumes. Moreover, the graphite composite is difficult to ignite because its the high ignition temperature and as such is self cooling which also prevents the fire from spreading.

What is claimed is:

1. A method of forming a fire proof flexible graphite covering for a wall or floor comprising the steps of:
   contacting particles of graphite flake with an intercalating agent for forming particles of intercalated graphite;
   heating particles of intercalated graphite at an elevated temperature to form particles of exfoliated graphite;
   combining particles of intercalated graphite with particles of exfoliated graphite in a predetermined proportion; and
   compressing the combined particles into a densely compressed graphite sheet and rolling the compressed graphite sheet into a roll; wherein said particles of intercalated graphite are laid down to form a first bed of particles and wherein said particles of exfoliated graphite are laid down to form a second bed of particles with the second bed of particles superimposed over said first bed of particles for forming a two layer composite.

2. A method as defined in claim 1 wherein said two layer composite is compressed into a sheet.

3. A method as defined in claim 2 wherein the percentage of particles of intercalated graphite in said composite lies in a range of between 30–50%.

4. A method as defined in claim 1 wherein a third bed of intercalated graphite particles is superimposed over said second bed of particles to form a three layer covering.

5. A method as defined in claim 4 wherein the first and third beds are symmetrically arranged about the second bed with the percentage of particles of intercalated graphite in said composite in a range of between 10–60%.

* * * * *